(12) United States Patent
Weber

(10) Patent No.: US 8,240,455 B2
(45) Date of Patent: Aug. 14, 2012

(54) DEVICE AND METHOD FOR TRANSFERRING A GROUP OF PRODUCTS FROM AN INPUT CONVEYOR TO AN OUTPUT CONVEYOR

(75) Inventor: Guenther Weber, Zachow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 349 days.

(21) Appl. No.: 12/441,558

(22) PCT Filed: Jul. 24, 2007

(86) PCT No.: PCT/EP2007/006570
§ 371 (c)(1),
(2), (4) Date: Dec. 2, 2009

(87) PCT Pub. No.: WO2008/034482
PCT Pub. Date: Mar. 27, 2008

(65) Prior Publication Data
US 2010/0140051 A1 Jun. 10, 2010

(30) Foreign Application Priority Data
Sep. 20, 2006 (DE) .................. 10 2006 044 286

(51) Int. Cl.
*B65G 47/30* (2006.01)
(52) U.S. Cl. .................. 198/418.6; 198/429
(58) Field of Classification Search .............. 198/418.6, 198/429, 430, 540, 607
See application file for complete search history.

(56) References Cited

U.S. PATENT DOCUMENTS

| | | | |
|---|---|---|---|
| 3,529,711 A * | 9/1970 | Moeller | 198/409 |
| 3,848,725 A | 11/1974 | Toby | |
| 4,104,984 A * | 8/1978 | Kellermann et al. | 118/676 |
| 4,265,354 A * | 5/1981 | Sinnema | 198/374 |
| 4,863,008 A * | 9/1989 | Doi | 198/433 |
| 5,232,080 A * | 8/1993 | van Essen et al. | 198/418.6 |
| 5,768,856 A | 6/1998 | Odenthal | |
| 6,834,755 B2 * | 12/2004 | Jay | 198/418.6 |
| 7,080,968 B2 * | 7/2006 | Blackwell et al. | 414/798.9 |
| 7,185,751 B2 * | 3/2007 | Guidetti | 198/418.6 |
| 7,581,634 B2 * | 9/2009 | Hart et al. | 198/418.6 |
| 7,757,462 B2 * | 7/2010 | Harrison et al. | 53/447 |

FOREIGN PATENT DOCUMENTS

| | | |
|---|---|---|
| DE | 25 43 567 | 4/1976 |
| DE | 37 20 638 | 1/1988 |
| EP | 0 371 687 | 6/1990 |

OTHER PUBLICATIONS

International Preliminary Report on Patentability dated Apr. 16, 2009. PCT/EP2007/006570.
International Search Report dated May 11, 2007 PCT/EP2007/006570.

* cited by examiner

*Primary Examiner* — Joseph A Dillon, Jr.
(74) *Attorney, Agent, or Firm* — Gifford, Krass, Sprinkle, Anderson & Citkowski, P.C.

(57) ABSTRACT

The invention relates to a device for transporting food products (20), particularly product slices produced by means of a slicer (26, 28, 30), comprising at least one transfer station (10) for receiving food products from an incoming product stream flowing in from at least one incoming conveyor (12) and for transferring the food products to an outgoing conveyor (14), wherein the transfer station comprises a transfer unit that is configured to simultaneously transfer a group of successively received food products to the outgoing conveyor.

10 Claims, 4 Drawing Sheets

Figure 1:
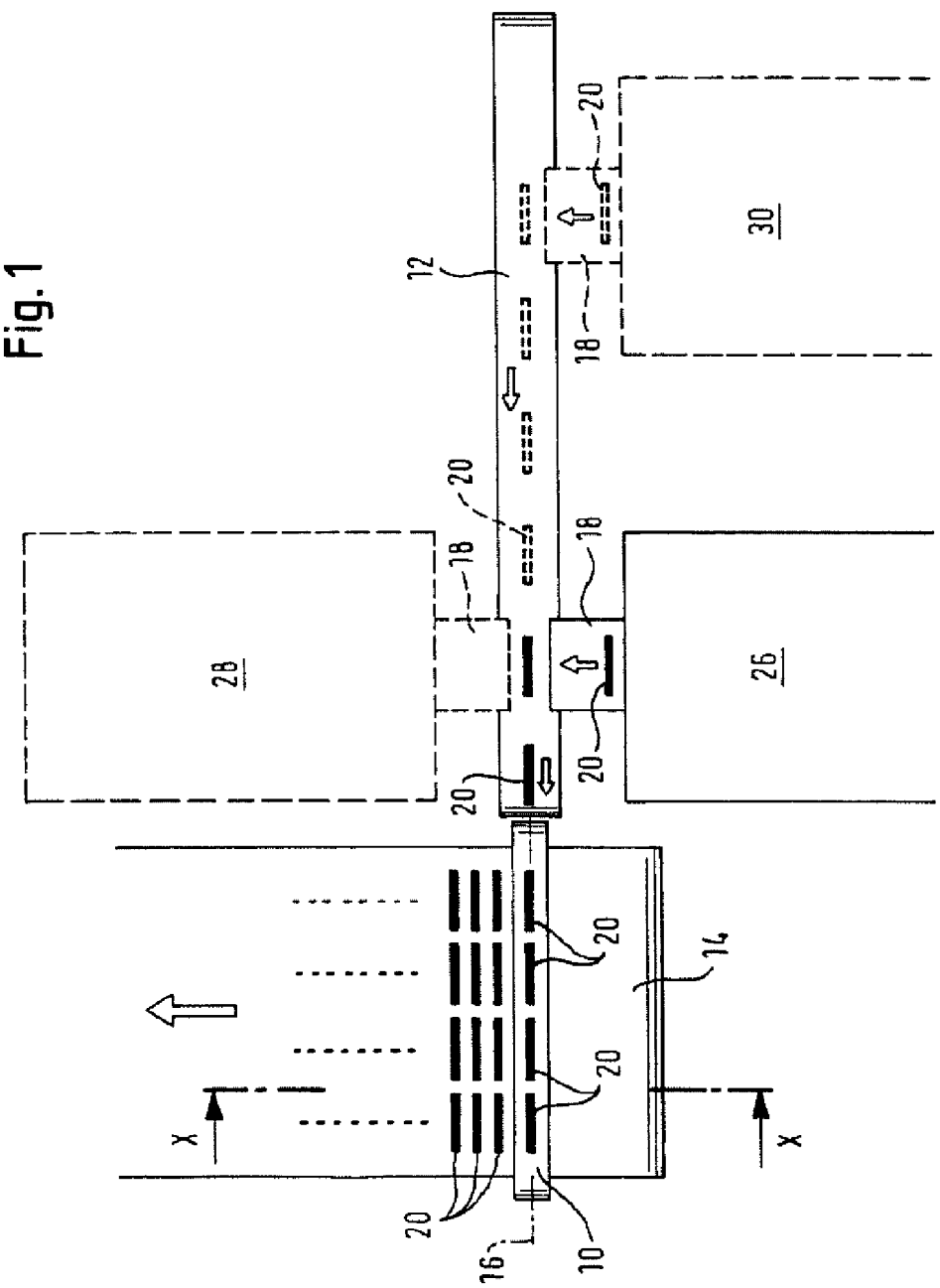

Fig. 4
Abb. a
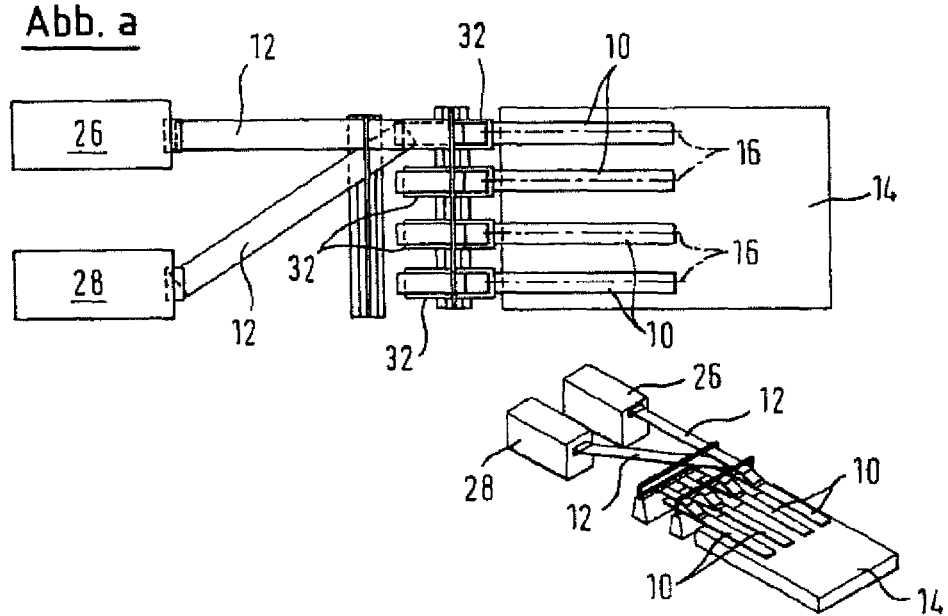
Abb. b
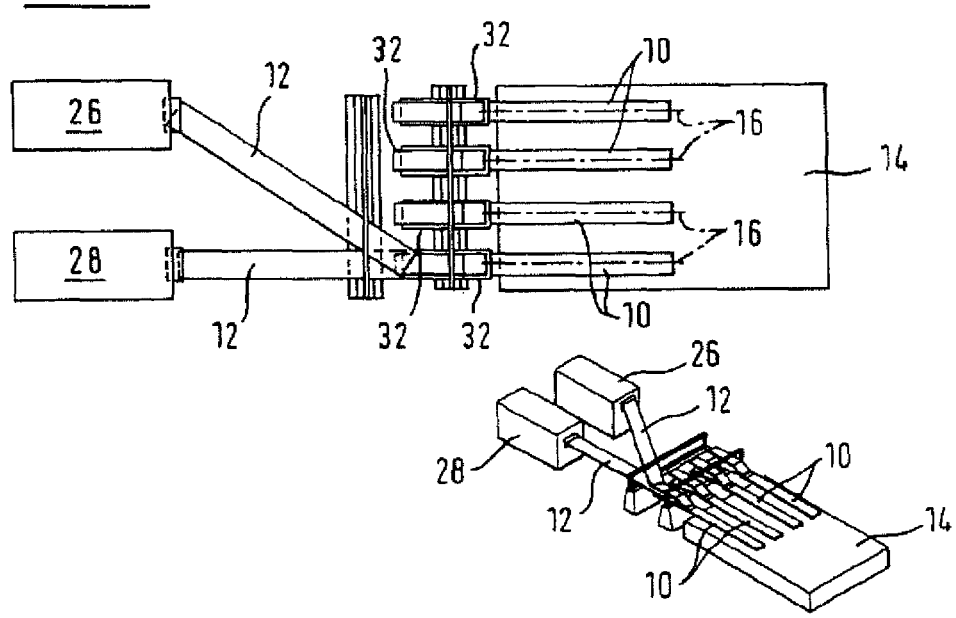

DEVICE AND METHOD FOR TRANSFERRING A GROUP OF PRODUCTS FROM AN INPUT CONVEYOR TO AN OUTPUT CONVEYOR

CROSS-REFERENCE TO RELATED APPLICATIONS

This application is the U.S. national phase of PCT/EP2007/006570 filed Jul. 24, 2007, which claims priority of German Patent Application No. DE 10 2006 044 286.5 filed Sep. 20, 2006.

The present invention relates to an apparatus for the transport of food products, in particular of product slices produced by means of one or more slicers. The invention furthermore relates to an endless belt conveyor with which food products located thereon can be delivered simultaneously. The invention furthermore relates to a transport method. Finally, the invention relates to a method for the simultaneous delivery of a group of food products located on an endless belt conveyor.

In the processing of food products—in particular in the transport of product slices produced by cutting up product loaves (for example, cheese, sausage, ham and bacon) by means of cutting machines also called slicers from the cutting machine to subsequently arranged processing stations (such as an oven for the final cooking of bacon slices)—there is the need to transfer the products from a conveyor arranged subsequent to the cutting machines to a further conveyor (outgoing conveyor) which supplies the product slices to the subsequently arranged processing station and whose conveying direction can extend transversely to the transport direction of the incoming product slices. The outgoing conveyor can in this respect have a comparatively large width which varies according to application, but with in each case a plurality of product slices being able to be supplied to the processing station, e.g. to the oven, simultaneously in rows or "tracks" disposed next to one another and extending transversely to the direction of conveying of the outgoing conveyor.

This row-like arrangement of the individual product slices transversely to the direction of conveying can be achieved in a generally known manner, for example, in that the individual product slices are first transferred to a so-called stepping belt conveyor which transfers the product slices individually to the outgoing conveyor. The stepping belt conveyor is e.g. a freely projecting endless belt which, at its free end, transfers the sequentially incoming product slices individually to the outgoing conveyor. In this connection, the stepping belt conveyor is drawn back transversely to the direction of conveying of the outgoing conveyor during the transfer so that the individual product slices are deposited over the total width of the outgoing conveyor. However, so that the individual product slices are not deposited diagonally on the outgoing conveyor as a result of the conveying movement of the outgoing conveyor, the outgoing conveyor is stopped for the transfer, which results in an unwanted manner in a processing stop and/or requires complex and/or expensive buffering measures and thus reduces the productivity of the total system.

It is therefore the object of the present invention to improve the product transport and in particular the product transfer such that such productivity losses are avoided.

The object underlying the invention is satisfied and in particular in that at least one transfer station is provided which serves for the taking up of food products of an incoming product flow incoming from at least one incoming conveyor and for the transfer of the food products to an outgoing conveyor, with the transfer station including a transfer device which is made to transfer a group of food products taken up after one another to the outgoing conveyor simultaneously.

The transfer station thus serves so-to-say as a collection station in the region of which a group of food products running in after one another is initially collected in order for it to be subsequently transferred to the outgoing conveyor simultaneously. A kind of parallelization of the incoming product flow hereby takes place since the products reach the transfer station after one another, but leave it simultaneously.

The outgoing conveyor can advantageously be operated continuously and thus a transfer-induced productivity loss can be avoided by the invention since the simultaneous transfer of the products allows an ideal utilization of space of the outgoing conveyor. Interruptions or delays of the product supply can also be avoided at the incoming side with a corresponding time coordination of the transfer procedure.

It is furthermore of advantage that the outgoing conveyor can generally have a width of any desired size. Then, only a matching of the size of the transfer station or of the number of transfer stations present is required. However, —contrary to what would e.g. be the case with a stepping belt conveyor— no more time is needed for the transfer despite the large width of the outgoing conveyor. Stepping belt conveyors are moreover not available in any desired length.

The object is additionally satisfied and in particular in that, in the method for the simultaneous transfer of a group of transported food products from an incoming conveyor to an outgoing conveyor, food products supplied after one another from the incoming conveyor in an incoming product flow are first collected and subsequently a group of collected food products is transferred to the outgoing conveyor simultaneously. The direction of conveying of the outgoing conveyor can in particular differ from the direction of conveying of the incoming conveyor, whereby a kind of parallelization of the incoming product flow can take place since then products reach the transfer situation after one another, but leave it simultaneously.

Preferred embodiments of the invention are set forth in the dependent claims, in the description and in the drawing.

The transfer station can, for example, be made as a conveyor and in particular as an endless belt conveyor which is also called a transfer conveyor in the further text. The individual food products can be supplied after one another to the transfer conveyor which then itself transports the products into the respective outgoing position for the transfer to the outgoing conveyor.

An endless band conveyor can be provided in any desired length. Furthermore, an endless belt conveyor in particular ideally fits into the conveying technology already present in practice with respect to control and product take-up. An endless belt conveyor in particular allows an exact positioning of the products to be transferred relative to pre-set "tracks" of the outgoing conveyor in a particularly simple manner.

The transfer device of the transfer station effecting the transfer is a pivot mechanism, for example. The products to be transferred are so-to-say simply "tipped off". An endless belt conveyor can e.g. be rotated, i.e. turned, in each case through 180° about an axis extending between the upper run and the lower run in the conveying direction, whereby a take-up surface for the products is immediately available again after transfer has taken place without the need of a return movement with the respective other run. The product supply can take place continuously by a corresponding time coordination of the turning procedures to the sequence of the supplied products since a sufficiently fast pivoting of the endless tape conveyor is possible without problem.

Basically, the product transfer can also take place in a different manner in particular in dependence on the nature of the products and on the design of the respective conveying technology. Purely by way of example, sliding devices or blowing devices are mentioned here which act simultaneously on the products to be transferred to move them toward the outgoing conveyor.

In accordance with an embodiment, the direction of conveying of the outgoing conveyor differs from the direction of conveying of the incoming conveyor and in particular extends transversely thereto. Since the transfer station serves in the mentioned manner so-to-say as a collection station in the region of which a group of food products incoming after one another is initially collected to subsequently transfer them to the outgoing conveyor simultaneously, a parallelization of the incoming product flow can thus take place since the products reach the transfer station after one another, but leave it simultaneously. Furthermore, an even better utilization of space of the outgoing conveyor can be achieved by the simultaneous transfer of the products transversely to the direction of conveying of the outgoing conveyor. Interruptions or delays of the product supply can also be avoided on the incoming side with a corresponding time coordination of the transfer process to the product supply.

In accordance with a further embodiment, the transfer station extends at a right angle to the direction of conveying of the outgoing conveyor. It can hereby be achieved that food products transferred respectively simultaneously to the outgoing conveyor also reach the processing station arranged subsequent to the outgoing conveyor simultaneously, which is desirable in most costs in a technical production respect. The transfer station can, however, generally, also extend obliquely to the direction of conveying, which has the consequence that products transferred simultaneously to the outgoing conveyor are still arranged in rows spaced apart in parallel on the outgoing conveyor, but these rows now extend obliquely to the direction of conveying of the outgoing conveyor.

So as not to have to accept any productivity loss as a result of the loading of the slicers, in accordance with the invention a plurality of cutting machines can be provided with which the incoming conveyor is loaded for the generation of the incoming product flow with food products. This in particular proves to be advantageous when the cutting time for the cutting up of a product loaf is essentially equally as long as the loading time of the machine. In the time in which the one machine is being loaded, the other machine can therefore cut and vice versa.

The invention will be described in the following by way of example with reference to the drawing. There are shown:

FIG. 1 a plan view of a transport apparatus in accordance with the invention with a transfer station in the form of an endless belt conveyor.

Figure 2:
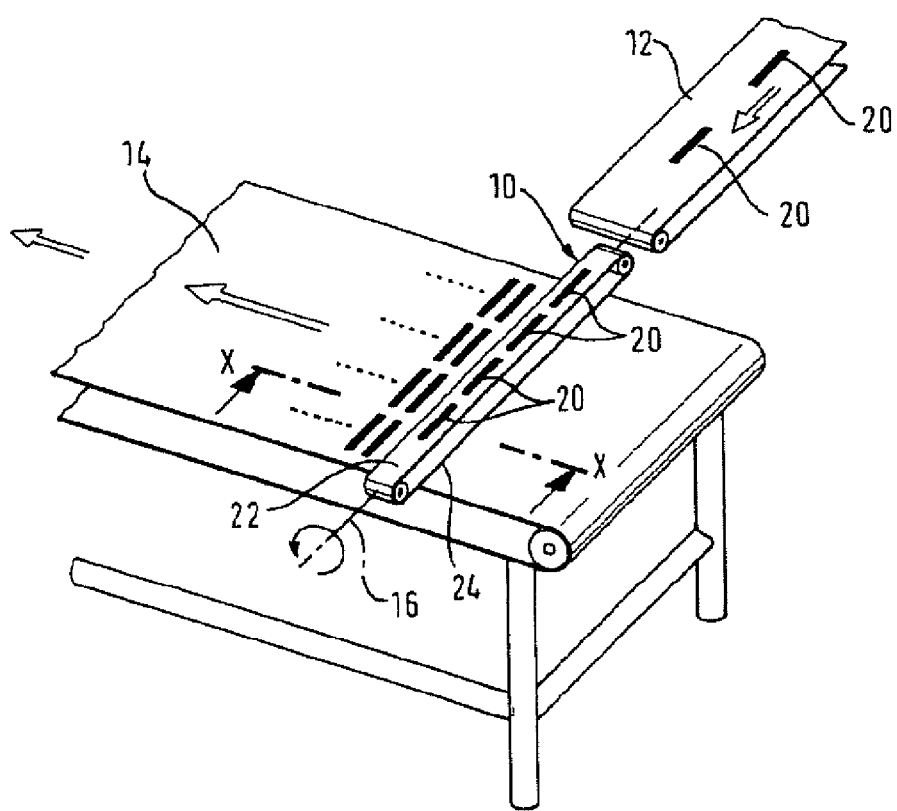
Figure 3:
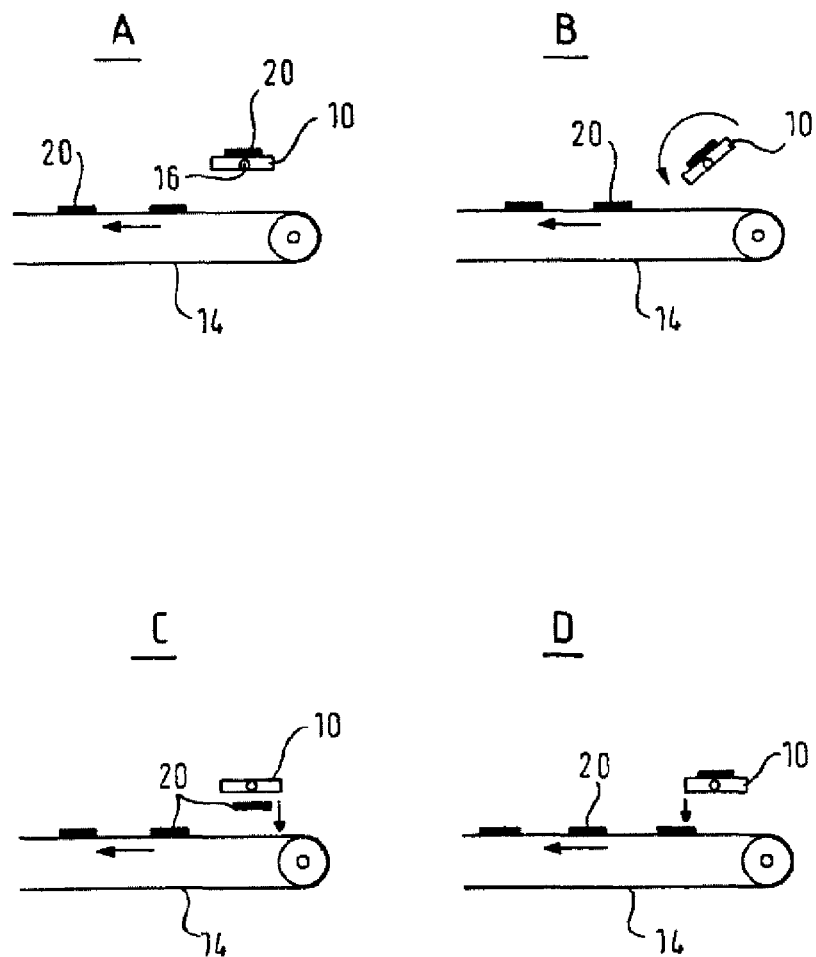

FIG. 2 a perspective representation of the transfer region between the incoming conveyor and the outgoing conveyor;

FIG. 3 four sectional representations through the transfer conveyor along the line X-X in FIGS. 1 and 2; and FIG. 4 in diagrams a and b plan views (in each case including a perspective view) of another transport apparatus in accordance with the invention with a transfer station with a plurality of endless belt conveyors.

In all Figures, the same elements or elements corresponding to one another are marked by the same reference numerals.

First, a part of a system is described with reference to FIG. 1 with which product slices 20 are produced from product loaves not shown in any more detail and which can be supplied to a subsequently disposed processing station, for example a cooking oven (not shown), in a plurality of equally spaced apart product rows or tracks.

The production system shown in FIG. 1 substantially includes one or two (variant shown in dashed lines) slicers 26, 28, 30, an incoming conveyor 12 in the form of an endless belt conveyor, an outgoing conveyor 14 in the form of an endless belt conveyor as well as a transfer conveyor 10 which is likewise made as an endless belt conveyor.

Respective removal belts 18 lead from the cutting machines 26, 28, 30 to the incoming conveyor 12 to be able to supply the cut off product slices 20 to the incoming conveyor 12. If two slicers 28, 30 are provided, they are operated alternately, that is in loading pauses of the respective other slicer. Basically, more than two slicers can also be provided which are operated in suitable time coordination.

Ultimately, a continuous incoming product flow of uniformly spaced apart product slices 20 is formed on the incoming conveyor 12 by means of the slicer or slicers. In the embodiment shown, the transfer conveyor 10 adjoins the end of the incoming conveyor directly and in the same orientation so that the transfer conveyor 10 is continuously loaded with the individual product slices 20 of the product flow.

The transfer conveyor 10 is arranged in this respect such that it overlaps the outgoing conveyor 14 in an overlap region in that it extends, in the specific embodiment shown here, above the outgoing conveyor 14, and indeed perpendicular to its direction of conveying. Unlike the known stepping belt conveyors, which are longitudinally changeable as a result of function, the transfer conveyor 10 in accordance with the invention is arranged in a stationary manner with respect to the incoming conveyor 12 and the outgoing conveyor 14.

The product flow supplied to the transfer conveyor 10 is transported into the overlapping region with its own endless belt so that the individual product slices 20 can be oriented in alignment with the tracks (indicated by the dotted rows in FIG. 1) of the outgoing conveyor 14 or of the oven. The group comprising four slices 20 here is then transferred to the outgoing conveyor 14 simultaneously from this position of the product slices 20, which is also called the outgoing position.

FIG. 2 shows the transfer region or overlap region in an enlarged perspective representation. The transfer conveyor 10 is made as an endless belt conveyor with an upper run 22 and a lower run 24. A pivot mechanism, not shown, is associated with the endless belt conveyor 10 for the transfer to the outgoing conveyor 14, with which pivot mechanism the endless belt conveyor 10 can be pivoted about an axis 16 which extends parallel to the direction of conveying of the endless belt conveyor 10 and between the upper run 22 and the lower run 24 (FIG. 3).

By actuating the pivot mechanism, a tipping or pivoting movement of the transfer conveyor 10 about the axis of rotation 16 can be initiated which here amounts to 180° in each case, i.e. the transfer conveyor 10 is respectively turned, whereby the upper run becomes the lower run and vice versa. The group of the previously taken up product slices 20 is in this connection "tipped" onto the outgoing conveyor 14, with each product slice 20 falling precisely onto one of the preset tracks.

FIG. 3 shows the individual phases of the transfer process. In situation A, the products 20 are in the previously discussed outgoing position on the upper run of the transfer conveyor or endless belt conveyor 10. As soon as the outgoing position has been reached, the transfer conveyor 10 is pivoted about the axis 16 (situation B) by actuation of the pivot mechanism, which has the result (situation C) that the products 20 fall from the upper run, which now becomes the lower run of the transfer conveyor 10, onto the outgoing conveyor 14. As shown in situation D, the taking up of the next group of products 20 is started as soon as the 180° turn of the endless belt conveyor 10 has been completed and the required reversal of direction of the belt drive of the endless belt conveyor has taken place.

This all takes place without interruption or delay of the incoming product flow (FIGS. 1 and 2) since the 180° pivot movements—in relation to the time between two sequential product slices 20—can be carried out sufficiently fast and the mentioned changeover of the drive direction is also not problematic in a time respect, particularly since it can already be carried out at the start of the pivot movement.

In accordance with FIGS. 1 and 2, the supply of the product slices 20 takes place in a row by means of the incoming conveyor 12 so that the transfer to the outgoing conveyor also takes place in one row, with here a product row including by way of example—in accordance with the required oven tracks—precisely four products 20 behind one another (considered at the incoming side) or next to one another (considered at the outgoing side). This parallelization of sequentially incoming products 20 which are to be transferred simultaneously is generally also possible with a multi-row incoming product flow, with the group of products 20 to be transferred not being arranged in a row on the transfer conveyor 10, but rather in a "matrix" of n incoming rows and m outgoing rows, where m—in accordance with the width or the number of tracks of the outgoing conveyor 14 and while matching the length of the transfer conveyor 10—can generally be selected as desired independently of n.

Finally, with reference to the diagrams a and b of FIG. 4, another production system is described with which product slices can likewise be produced from product loaves not described any more precisely and can be supplied to a subsequently disposed processing station in a plurality of uniformly spaced apart rows or tracks.

The production system shown in FIG. 4 substantially comprises two slicers 26, 28, two incoming conveyors 12 in the form of endless belt conveyors leading away therefrom, an outgoing conveyor 14 in the form of an endless belt conveyor as well as four transfer conveyors 10 which are likewise made as endless belt conveyors and which are loaded with an incoming product flow via four equalization conveyors 32.

Here, too, two slicers 26, 28 are provided so that in each case the loading of the transfer conveyors 10 can be maintained by the other slicer in the loading pauses of the one slicer. Generally, more than two slicers 26, 28 can also be provided which are operated in suitable time coordination. In diagram a of FIG. 4, the slicer 28 is active and is loading the equalization conveyor 32 with a continuous product flow, whereas the slicer 26 is active in diagram b of FIG. 4.

To load the four transfer conveyors 10 with a product low after one another, the incoming conveyors 12 are pivotable about a perpendicular axis located close to the respective slicer. This distribution of the products onto the equalization conveyors 32 can also be achieved by a different movability or adjustability of the incoming conveyors 12. The equalization conveyors 32 are here connected between the transfer conveyors 10 and the incoming conveyors 12 to equalize the range of the incoming conveyors which differs as a result of the pivoting.

In this embodiment, the four transfer conveyors 10 also overlap with the outgoing conveyor 14 in an overlap region, with here the transfer conveyors 10 being aligned parallel to the outgoing conveyor 14. In other terms, the four transfer conveyors 10 convey in the same direction as the outgoing conveyor 14.

During operation, the four transfer conveyors 10 are loaded with a product flow after one another via the incoming conveyors 12 and the equalization conveyors 32, for which purpose the incoming conveyors 12 are pivoted in the mentioned manner. The product flow supplied to the transfer conveyors 10 is transported with their own endless belts into the overlap region so that the individual product slices are aligned with the tracks of the outgoing conveyor 14 or of the oven. From this position of the product slices 20, the food products are then in turn transferred group-wise and simultaneously to the outgoing conveyor 14 in that the transfer conveyors 10 are pivoted or tipped in the previously described manner.

The special feature of this embodiment lies in the arrangement of a plurality of transfer conveyors 10 parallel to one another, with the transfer conveyors 10 not being loaded simultaneously, but rather after one another, namely by means of the incoming conveyor 12 pivotable here.

To avoid gaps from arising in the individual tracks between sequential groups with a continuously running outgoing conveyor 14 due to the sequentially taking place loading and tipping of the transfer conveyors 10, the conveying speed of the outgoing conveyor 14 is matched to the conveying speed of the equalization conveyors 32 and of the incoming conveyors 12 such that each transfer conveyor 10 is ready for the transfer of the next group in good time after the transfer of a group in order to be able to transfer this next group to the outgoing conveyor 14 without a gap to the previous group. The outgoing conveyor 14 is therefore operated at a lower speed than the conveyors at the incoming side, and indeed in particular at a speed such that all the conveyors can be operated continuously.

Overall, a gapless "matrix" of products can also be achieved in this manner with a number of tracks on the outgoing conveyor 14 corresponding to the number of transfer conveyors 10. In this respect, it can be achieved by a corresponding matching of the conveying speeds and of the distribution to the individual transfer conveyors that the product groups transferred after one another to the outgoing conveyors cannot be distinguished within each track to the extent that the product spacing within the groups is equal to the spacing between groups following one another, i.e. is equal to the spacing between the last product of a group and the first product of the following group.

The variant of FIG. 4 differs from the variant in accordance with FIGS. 1 to 3 by the orientation of the product slices with respect to the conveying direction of the outgoing conveyor 14. This can have an effect on the process speed with a shape of the product slices differing from a circular shape or from a square shape and in particular with rectangular product slices—as shown. In the variant in accordance with FIGS. 1 to 3, more products can be accommodated per length unit measured in the conveying direction than in the variant in accordance with FIG. 4 due to the transverse orientation of the rectangular products on the outgoing conveyor 14. With the same number of tracks on the outgoing conveyor 14 and at the same speed of the outgoing conveyor 14, a higher product throughput consequently has to be achieved by the transfer station in the variant in accordance with FIGS. 1 to 3 than in the variant in accordance with FIG. 4, which brings about a product handling with a correspondingly higher process speed overall all at the incoming side.

| Reference numeral list | |
|---|---|
| 10 | transfer station, transfer conveyor |
| 12 | incoming conveyor |
| 14 | outgoing conveyor |
| 16 | pivot axis |
| 18 | removal belt |
| 20 | food product, product slice |
| 22 | upper run |
| 24 | lower run |
| 26 | cutting machine, slicer |
| 28 | cutting machine, slicer |
| 30 | cutting machine, slicer |
| 32 | equalization conveyor |

The invention claimed is:

1. An apparatus for the transport of food products (20) comprising at least one transfer station (10) for the picking up of food products (20) of an incoming product flow running in from at least one incoming conveyor (12) and for the transfer of the food products (20) to an outgoing conveyor (14),
wherein the transfer station (10) includes a transfer device which simultaneously transfers a group of food products (20) taken up after one another to the outgoing conveyor (14);
wherein the transfer conveyor (10) includes an endless belt conveyor with an upper run (22) and a lower run (24);
wherein the transfer device includes a transfer conveyor with a pivot mechanism having a pivot axis (16); and
wherein the pivot axis (16) extends between the upper run (22) and the lower run (24) in the conveying direction of the transfer conveyor (10).

2. An apparatus in accordance with claim 1, characterized in that the transfer station (10) is arranged in a stationary manner with respect to the incoming conveyor (12) and/or to the outgoing conveyor (14).

3. An apparatus in accordance with claim 1, characterized in that the direction of conveying of the outgoing conveyor (14) differs from the direction of conveying of the incoming conveyor (12).

4. An apparatus in accordance with claim 1, characterized in that the transfer conveyor (10) coincides or overlaps with the outgoing conveyor (14) transversely to its direction of conveying.

5. An apparatus in accordance with claim 1, characterized in that the transfer conveyor (10) extends above the outgoing conveyor (14).

6. An apparatus in accordance with claim 1, characterized in that the simultaneous transfer of the group of taken up food products (20) takes place while using gravity.

7. An apparatus in accordance with claim 1, wherein said pivot mechanism pivots said transfer conveyor (10) by 180°.

8. An apparatus in accordance with claim 7, characterized in that the transfer conveyor (10) is capable of a reversal of direction of its conveyor drive for the maintenance of its direction of conveying after each turn through 180°.

9. An apparatus in accordance with claim 1, characterized in that the transfer conveyor (10) is arranged essentially at a right angle or parallel to the direction of conveying of the outgoing conveyor (14), with a plurality of transfer conveyors (10) preferably being arranged next to one another in the case of a parallel arrangement.

10. An apparatus in accordance with claim 1, characterized in that the direction of conveying of the transfer conveyor (10) and the direction of conveying of the incoming conveyor (12) substantially coincide.

* * * * *